(12) United States Patent
Garvey et al.

(10) Patent No.: US 10,452,385 B2
(45) Date of Patent: Oct. 22, 2019

(54) SCALABLE ARTIFICIAL INTELLIGENCE DRIVEN CONFIGURATION MANAGEMENT

(71) Applicant: Oracle International Corporation, Redwood Shores, CA (US)

(72) Inventors: Dustin Garvey, Exeter, NH (US); Timothy Mark Frazier, Livermore, CA (US); Shriram Krishnan, Oakland, CA (US); Uri Shaft, Fremont, CA (US); Amit Ganesh, San Jose, CA (US); Prasad Ravuri, San Jose, CA (US); Sampanna Shahaji Salunke, Dublin, CA (US); Sumathi Gopalakrishnan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/041,269

(22) Filed: Jul. 20, 2018

(65) Prior Publication Data

US 2019/0138290 A1 May 9, 2019

Related U.S. Application Data

(60) Provisional application No. 62/566,235, filed on Sep. 29, 2017.

(51) Int. Cl.
*G06F 9/44* (2018.01)
*G06F 8/65* (2018.01)
(Continued)

(52) U.S. Cl.
CPC .................. *G06F 8/65* (2013.01); *G06F 8/60* (2013.01); *G06F 8/61* (2013.01); *G06F 9/5055* (2013.01); *G06F 16/906* (2019.01); *G06N 20/00* (2019.01)

(58) Field of Classification Search
None
See application file for complete search history.

(56) References Cited

U.S. PATENT DOCUMENTS 6,801,937 B1 10/2004 Novaes et al.
7,020,695 B1 3/2006 Kundu et al.
(Continued)

FOREIGN PATENT DOCUMENTS

WO 2011/071624 A2 6/2011
WO 2011/102891 A1 8/2011
(Continued)

OTHER PUBLICATIONS

Witten, Daniela M. & Robert Tibshirani (2010), "A framework for feature selection in clustering", Journal of the American Statistical Association, vol. 105, No. 490, pp. 713-726: 2010.
(Continued)

*Primary Examiner* — Qamrun Nahar
(74) *Attorney, Agent, or Firm* — Invoke

(57) ABSTRACT

Techniques are described herein for scalable clustering of target resources by parameter set. In some embodiments, a plurality of parameter sets of varying length are received, where a parameter set identifies attributes of a target resource. A plurality of signature vectors are generated based on the plurality of parameter sets such that the signature vectors have equal lengths. A signature vector may map to one or more parameter sets of the plurality of parameter sets. A plurality of clusters are generated based on the similarity between signature vectors. Operations may be performed on a target resource based on one or more nodes in the plurality of clusters.

20 Claims, 9 Drawing Sheets

(51) Int. Cl.
*G06N 20/00* (2019.01)
*G06F 8/60* (2018.01)
*G06F 16/906* (2019.01)
*G06F 8/61* (2018.01)
*G06F 9/50* (2006.01)

(56) References Cited

U.S. PATENT DOCUMENTS

| | | | |
|---|---|---|---|
| 7,739,143 | B1 | 6/2010 | Dwarakanath et al. |
| 7,739,284 | B2 | 6/2010 | Aggarwal et al. |
| 7,783,510 | B1 | 8/2010 | Gilgur et al. |
| 7,987,106 | B1 | 7/2011 | Turgut |
| 8,200,454 | B2 | 6/2012 | Dorneich et al. |
| 8,229,876 | B2 | 7/2012 | Shounak |
| 8,234,236 | B2 | 7/2012 | Beaty et al. |
| 8,261,295 | B1 | 9/2012 | Risbood et al. |
| 8,363,961 | B1 | 1/2013 | Avidan et al. |
| 8,576,964 | B2 | 11/2013 | Taniguchi et al. |
| 8,583,649 | B2 | 11/2013 | Ailon et al. |
| 8,635,328 | B2 | 1/2014 | Corley et al. |
| 8,694,969 | B2 | 4/2014 | Bernardini et al. |
| 8,880,525 | B2 | 11/2014 | Galle et al. |
| 9,053,171 | B2 | 6/2015 | Ailon et al. |
| 9,147,167 | B2 | 9/2015 | Urmanov et al. |
| 9,265,859 | B2 | 2/2016 | Gibson et al. |
| 9,330,119 | B2 | 5/2016 | Chan et al. |
| 9,355,357 | B2 | 5/2016 | Hao et al. |
| 9,420,513 | B1 | 8/2016 | Yalagandula et al. |
| 9,495,395 | B2 | 11/2016 | Chan et al. |
| 9,514,213 | B2 | 12/2016 | Wood et al. |
| 9,692,662 | B2 | 6/2017 | Chan et al. |
| 9,710,493 | B2 | 7/2017 | Wang et al. |
| 2003/0224344 | A1 | 12/2003 | Shamir et al. |
| 2005/0278445 | A1 | 12/2005 | Quang et al. |
| 2005/0289538 | A1 | 12/2005 | Black-Ziegelbein et al. |
| 2007/0050497 | A1 | 3/2007 | Haley et al. |
| 2009/0316699 | A1 | 12/2009 | Mark et al. |
| 2010/0027552 | A1 | 2/2010 | Hill |
| 2011/0040575 | A1 | 2/2011 | Wright et al. |
| 2011/0125894 | A1 | 5/2011 | Anderson et al. |
| 2011/0126197 | A1 | 5/2011 | Larsen et al. |
| 2011/0126275 | A1 | 5/2011 | Anderson et al. |
| 2011/0231508 | A1 | 9/2011 | Torii |
| 2012/0254183 | A1* | 10/2012 | Ailon .................. G06F 16/285 707/738 |
| 2013/0326202 | A1 | 12/2013 | Rosenthal et al. |
| 2014/0067757 | A1 | 3/2014 | Ailon et al. |
| 2014/0379717 | A1 | 12/2014 | Urmanov et al. |
| 2015/0248446 | A1 | 9/2015 | Nordstrom et al. |
| 2016/0283533 | A1 | 9/2016 | Urmanov et al. |
| 2016/0299961 | A1 | 10/2016 | Olsen |
| 2016/0314184 | A1 | 10/2016 | Bendersky et al. |

FOREIGN PATENT DOCUMENTS

| | | |
|---|---|---|
| WO | 2011/151500 A1 | 12/2011 |
| WO | 2013/016584 A1 | 1/2013 |
| WO | 2017/123683 A1 | 7/2017 |

OTHER PUBLICATIONS

Tibshirani, Robert, Guenther Walther, & Trevor Hastie (2001), "Estimating the number of clusters in a data set via the gap statistic", Journal of the Royal Statistical Society B, vol. 63, Part 2, pp. 411-423: 2001.

Huang, Z. (1997), "A fast clustering algorithm to cluster very large categorical data sets in data mining", Proceedings of the SIGMOD Workshop on Research Issues on Data Mining and Knowledge Discovery, Dept. of Computer Science, The University of British Columbia, Canada, pp. 1-8.

Maarek Y. S., "On the Use of Cluster Analysis for Assisting Maintenance of Large Software Systems", Computer Systems and Software Engineering, 1988 Proceedings, The Third Israel Conference on Computer Systems and Software Engineering 1988, pp. 178-186.

Ham et al., "Interactive Visualization of Small World Graphs", INFOVIS '04 Proceedings of the IEEE Symposium on Information Visualization, 2004, pp. 199-206.

Voras et al.,"Criteria for evaluation of Open Source Cloud Computing Solutions", Information Technology Interfaces (ITI), Proceedings of the ITI2011 33rd International Conference on Information Technology Interfaces, US, IEEE, Jun. 27-30, 2011, pp. 137-142.

Taylor J W et al: "Forecasting intraday time series with multiple seasonal cycles using parsimonious seasonal exponential smoothing", Omega, vol. 40, No. 6, Dec. 2012 (Dec. 2012), pp. 748-757.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Somlo, Gabriel, et al., "Incremental Clustering for Profile Maintenance in Information Gathering Web Agents", AGENTS '01, Montreal, Quebec, Canada, May 28-Jun. 1, 2001, pp. 262-269.

Slipetskyy, Rostyslav, "Security Issues in OpenStack", Master's Thesis, Technical University of Denmark, Jun. 2011, 90 pages.

Niino, Junichi, "Open Source Cloud Infrastructure 'OpenStack', its History and Scheme", Available online at <http://www.publickey1.jp/blog/11/openstack_1.html>, Jun. 13, 2011, 18 pages (9 pages of English Translation and 9 pages of Original Document).

Jarvis, R. A., et al., "Clustering Using a Similarity Measure Based on Shared Neighbors", IEEE Transactions on Computers, vol. C-22, No. 11, Nov. 1973, pp. 1025-1034.

Haugen et al., "Extracting Common Time Trends from Concurrent Time Series: Maximum Autocorrelation Factors with Applications", Stanford University, Oct. 20, 2015, pp. 1-38.

Davies, David L., et al., "A Cluster Separation measure", IEEE Transactions on Pattern Analysis and Machine Intelligence, vol. PAMI-1, No. 2, Apr. 1979, pp. 224-227.

* cited by examiner

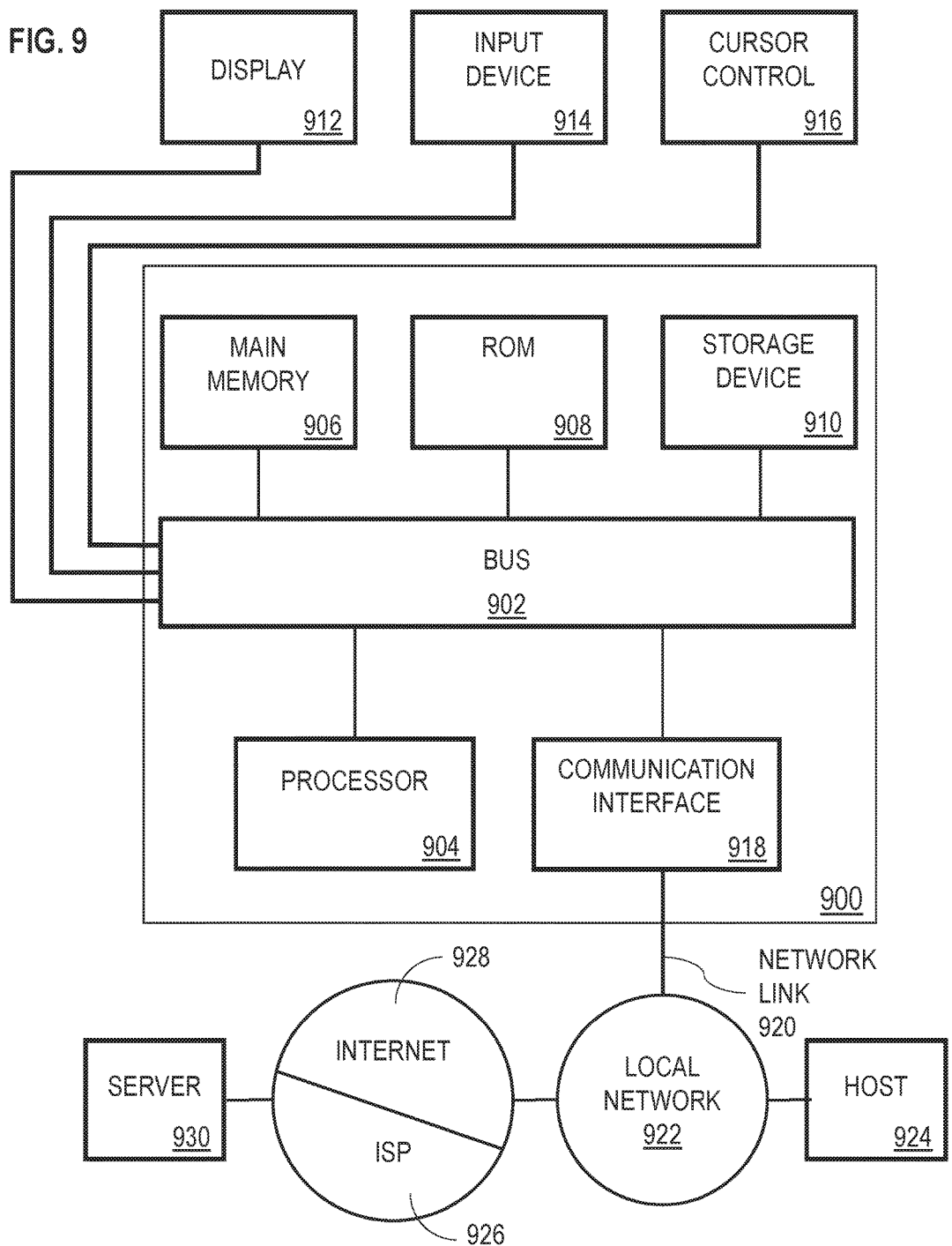

SCALABLE ARTIFICIAL INTELLIGENCE DRIVEN CONFIGURATION MANAGEMENT

BENEFIT CLAIM; RELATED APPLICATIONS; INCORPORATION BY REFERENCE

This application claims the benefit of U.S. Provisional Patent Application 62/566,235, filed Sep. 29, 2017, which is hereby incorporated by reference.

This application is related to U.S. patent application Ser. No. 15/140,358, titled "Scalable Tri-Point Arbitration and Clustering", the entire contents of which are hereby incorporated by reference as if set forth in their entirety.

TECHNICAL FIELD

The present disclosure relates to managing the configuration of deployed software resources.

BACKGROUND

Complex software systems are often difficult to manage due to the large number of possible combinations of configurations settings. For example, different deployments of the same software resource may have different combinations of language settings, security settings, patch set updates (PSUs), network settings, and/or other configuration settings. A failure to properly manage deployment configurations may expose a system to various problems including security vulnerabilities and performance degradation.

One approach for managing software configurations is the manual creation of a gold image. According to this approach, a system administrator selects the optimal configuration settings for a group of software deployments and creates a software image, referred to as a gold image, that includes the selected configuration settings. Software deployments are then compared to the gold image to identify configuration differences. This approach is effective when a system administrator knows the optimal configurations for each software resource. However, in large and growing environments, the optimal configurations may differ between different deployments of the same software resource, and the current optimal configuration is likely not the future optimal configuration. The system administrator may have limited domain knowledge and bandwidth to determine which configuration settings are optimal and which configuration settings are problematic. As a result, this approach does not scale well to cloud-based applications and other large-scale systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 shows a block diagram that illustrates a computer system in accordance with some embodiments.

DETAILED DESCRIPTION

Figure 1:
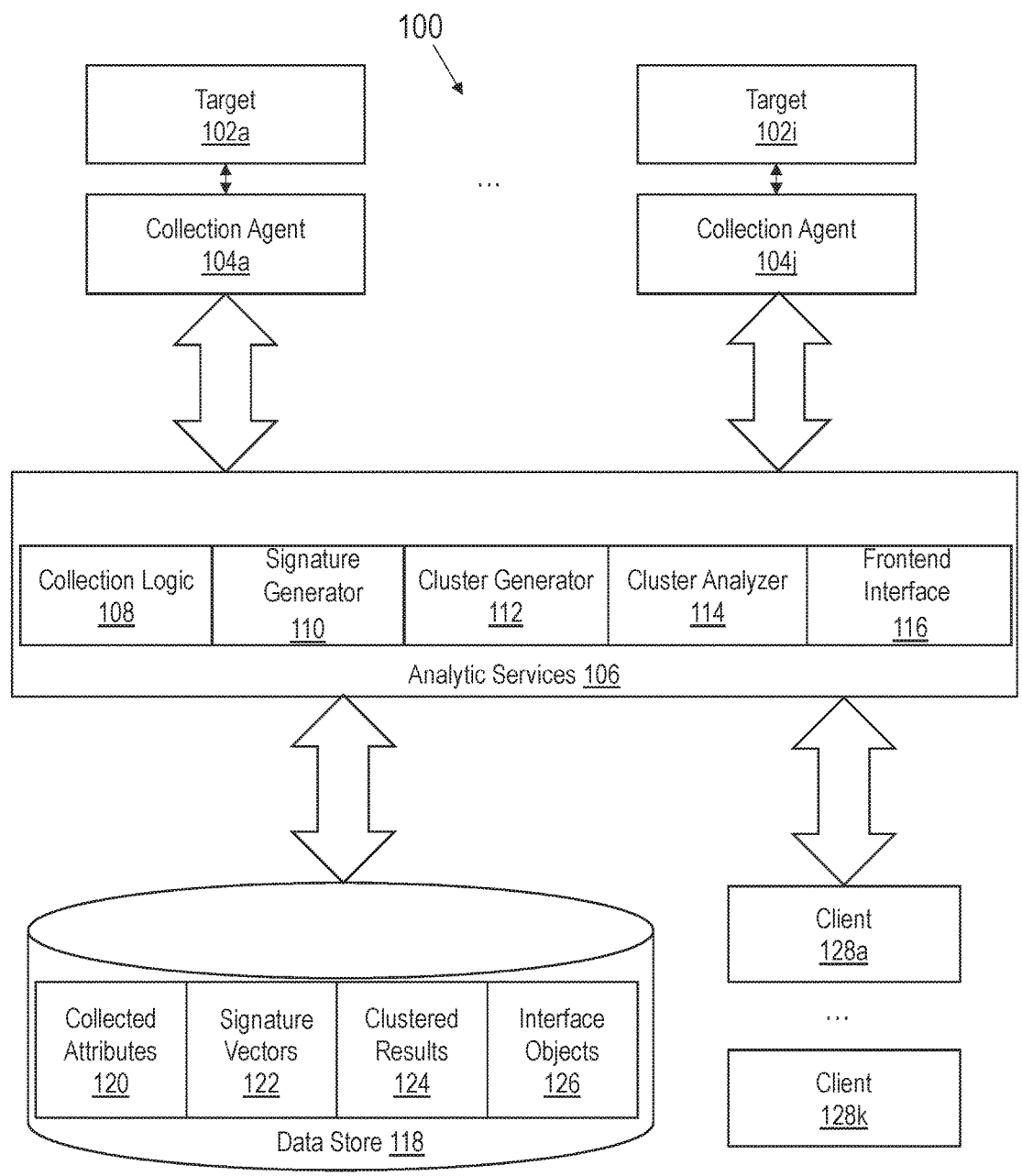
FIG. 1 illustrates an example system architecture for leveraging machine-learning to drive configuration management, in accordance with some embodiments.

In the following description, for the purposes of explanation, numerous specific details are set forth in order to provide a thorough understanding. Some embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. CLUSTERING ENTITIES BY PARAMETER SETS
   3.1 SIGNATURE GENERATION
   3.2 PARAMETER FILTERING
   3.3 CLUSTER GENERATION
   3.4 CLUSTER SUMMARIES AND REPRESENTATIVE NODES
4. INTERACTIVE INTERFACES FOR CONFIGURATION MANAGEMENT
   4.1 CLUSTER VISUALIZATIONS AND INTERFACES
   4.2 HYPOTHETICAL CLUSTERS AND REPRESENTATIVE NODE CHANGES
   4.3 SUMMARY VISUALIZATIONS
   4.4 DRAG-AND-DROP INTERFACE
5. CONFIGURATION MANAGEMENT OPERATIONS
   5.1 INITIALIZING NEW NODES
   5.2 UPDATING NODES AND REMEDIATING DRIFT
   5.3 GOLD IMAGE SUBSCRIPTIONS
   5.4 ANALYTIC OPERATIONS
   5.5 TROUBLESHOOTING OPERATIONS
6. COMPUTER NETWORKS AND CLOUD NETWORKS
7. MICROSERVICE APPLICATIONS
8. HARDWARE OVERVIEW
9. MISCELLANEOUS; EXTENSIONS

1. General Overview

Software entities may have parameter sets of varying sizes and parameter types. For example, different deployments of a software application may have varying numbers of software packages installed. The installed software packages may include packages provided by the software vendor, packages provided by third-party developer, custom-developed packages, or some combination thereof. As a result, the available combinations of parameters in a parameter set for a software entity is potentially unbounded.

Because parameter sets of software entities may be large and potentially unbounded, clustering software entities by parameter sets may present challenges in scalability. Clustering may be performed by sorting and performing direct comparisons of the parameter sets of different deployments of a software application. However, this approach may require a significant amount of memory and processing overhead. If a significant number of entities are being clustered, then this approach may be infeasible for applications with limited computing resources.

Another challenge with clustering parameter sets for software entities is that there may be no predefined metric value for grouping entities. As a result, clustering methods such as k-means and k-modes, may not be able to generate coherent clusters. For example, a parameter set may identify a package inventory for a software entity. A package inventory may identify the names of the packages and an indication of whether the packages are installed or not. Grouping by a "mean" or a "mode" value in this context generally does not make sense.

Techniques described herein provide scalable methods and systems for clustering software entities by parameter sets. In some embodiments, the techniques include generating signature vectors for distinct parameter sets. The signatures may have fixed-configurable length and may form a compressed representation of parameter sets of varying lengths. For example, one software entity may have 200 packages installed and another software entity may have 2,000 packages installed. Two signature vectors having equal length may be generated to represent the distinct parameter sets even though the parameter sets have significantly different sizes. As a result, the feature space is homogenized by converting parameter sets of variable sizes to signatures of a fixed size.

In some embodiments, the length of a signature vector is significantly smaller than the number of parameter being mapped to the signature vector. For example, parameter sets identifying hundreds or thousands of installed packages may be mapped to a signature vector having dozens of elements. As a result, the signature vector may represent a parameter set with a much smaller footprint than the raw data. The reduced number of elements in a signature vector also allows for faster sorting and comparison operations during clustering operations.

In some embodiments, different combinations of parameter sets are mapped to the same signature vector. For example, different deployments that have different packages installed may be represented by the same signature vector. Locality-sensitive hashing function may be applied to account for similarities between the parameter sets during the signature mapping process. With locality-sensitive hashing, parameter sets that are similar are more likely to be mapped to the same signature while dissimilar signatures are not mapped to the same signature. This approach allows signatures to be meaningfully compared while reducing the overall number of signatures that need to be compared during clustering operations.

In some embodiments, the length of the signature vector may be adjusted during runtime based on a set of one or more thresholds. The set of one or more thresholds may be defined to ensure the scalability of clustering operations. For example, a default length may initially be selected for a signature vector. If too many distinct vectors are generated, then the clustering process may take too long depending on the application and the available compute resources. The length of the signature vector may be reduced, and the signature vectors may be regenerated. This approach increases the likelihood that more distinct parameter configurations will map to the same signature vector, thereby reducing the overall number of signature vectors. Generating signature vectors is generally computationally less expensive than clustering large numbers of signature vectors. Therefore, the added processing cost of re-generating signature vectors may be offset by the savings of clustering fewer signature vectors.

In some embodiments, the signature vectors are clustered based on similarity. The clustering process may include generating a similarity matrix of signature vectors. The similarity matrix may be used to approximate a Jaccard index whereby the similarity of district sets are compared. Similar signature may then be clustered into the same group within memory while dissimilar signatures are organized into different groups.

In some embodiments, software entities are mapped to a cluster by signature. As previously indicated, software entities with different configurations may map to the same signature. Thus, signature in a cluster may correspond to one or more nodes, where each node represents a distinct configuration exhibited by at least one software entity.

In some embodiments, a representative node is selected and/or generated for a cluster. The representative node may represent a recommended or standard parameter set for software entities that belong to the cluster. In some embodiments, the representative node is selected as the node corresponding to the most frequently detected parameter set in the cluster. Other nodes may also be selected or constructed as the representative node depending on the implementation. For example, the representative node may be constructed from the most commonly occurring parameters across all nodes in the cluster. As another example, a user may select the representative node for a cluster.

In some embodiments, one or more management operations are performed based on the representative node for a cluster. For example, differing parameter sets may be reconciled against the recommended parameter sets. As another example, one or more software entities may subscribe to a particular node in a cluster. Once subscribed, the software entities may follow changes to representative node as parameter sets are updated over time. Additionally or alternatively, other operations may also be performed with respect to the representative node as described in further detail below.

2. System Architecture

FIG. 1 illustrates an example system architecture for leveraging machine-learning to drive configuration management, in accordance with some embodiments. As illustrated in FIG. 1, system 100 includes targets 102a-i, collection agents 104a-j, analytic services 106, data store 118, and clients 128a-k. In some embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Targets 102a-i correspond to hardware and/or software components used to support deployments of a particular resource. Example hardware targets may include host machines, server appliances, network adapters, and storage drives. Example software targets may include listeners, load balancers, virtual machines, middleware, and application instances. A software resource or system in this context may be a multi-tier software application running by use of a variety of hardware and software components. For example, a multi-tier application may include a presentation tier for interfacing with one or more users, an application tier for executing application-specific logic, and a data tier for storing and retrieving data. In other cases, a software resource may be an application or other software component within a single tier of a multi-tier application. For example, the software resource may correspond to a database management system executing in the data tier of a multi-tier application. In other embodiments, a software resource may be a standalone application, such as a desktop application, or other software component. Thus, the artificial intelligence driven management techniques described herein may be applied across a wide range of software resources.

Collection agents 104a-j collect deployment parameters from targets 102a-i and provide the deployment parameters to analytic services 106 for subsequent processing. One or more of collection agents 104a-j may be a daemon or background process that executes on the same host as a target. Additionally or alternatively, one or more of collection agents 104a-j may be located on a remote host from a target for which the agent is configured to collect parameters. Although one collection agent is depicted per target, a collection agent may collect parameters from multiple targets or from a single target, depending on the implementation.

The deployment parameters that are collected may vary from implementation to implementation. Example parameters include one or more of the following:

Configuration settings: These parameters identify configurations of a deployment of a software resource. For example, these parameters may identify what patches have been applied to the deployment, security settings such as firewall and open network port configurations, language settings such as what language has been selected on startup, operating system (OS) settings such as OS name and version on a host machine on which the software resource is configured to execute, and log settings such as the maximum log size and rate.

Static attributes: These parameters identify characteristics of a deployment that do not change during runtime. For example, a static attribute may encode information about the software binary or code footprint for a deployment. Static attributes may include information about the package inventory for a software resource. The package inventory refers to a set of one or more software packages that are installed.

Runtime attributes: These parameters identify characteristics of the deployment that are captured during runtime. For example, the parameters may capture runtime performance attributes such as average/min/max CPU performance, memory bandwidth, active sessions, and I/O throughput. The parameters may further capture bug reports, security vulnerabilities, log writing throughput, and other information that is not statically available.

System architecture: These parameters identify the structure and relationships of components used to run a software resource. For example, an attribute may identify information about the target host (or hosts) on which the software resource is run, such as the geographic location, hostname, and IP address. In another example, these parameters may capture topology/architecture information such as dependencies between different targets supporting a deployment of the software resource. In yet another example, these parameters may identify a list of available services that are supported by the deployment of the software resource.

In some embodiments, collection agents 104a-j are configured to collect package inventories for various deployments. A package inventory for a deployment includes a set of one or more software packages. A software package refers to a file or set of files including code that provides functionality to a software system. The code may be source code, bytecode, native machine code, or some combination thereof. A software package may include package metadata that describes the software package. For example, the package metadata may include a package description and a package version number. Additionally or alternatively, the package metadata may identify package dependencies, if any. A package dependency may exist if another software package needs to be installed for the software package to operate correctly. Collection agents 104a-j may determine which software packages have been installed for a given software entity and any package dependencies by processing a set of package metadata maintained for the software entity.

Analytic services 106 include a set of applications and/or web services that may be invoked to perform clustering and management operations as described further herein. Analytic services 106 comprises collection logic 108, signature generator 110, cluster generator 112, cluster analyzer 114, and frontend interface 116. Each service implements a function or set of functions as follows:

Collection logic 108 interfaces with collection agents 104a-j to collect deployment parameters for a plurality of deployments of a software resource;

Signature generator 110 generates configuration signatures based on combinations of configuration parameters;

Cluster generator 112 clusters the configuration signatures and corresponding target deployments based on similarities;

Cluster analyzer 114 summarizes/annotates clusters based on members of the cluster; and Frontend interface 116 provides an interface through which one or more functions of analytic services 106 may be invoked.

The set of functions summarized above may be implemented by a single service or through different services. Additionally or alternatively, functions shown as performed by a single service may be executed by different services, depending on the particular implementation. One or more of the services may be encapsulated into a microservice application and/or a cloud application, such as a software-as-a-services (SaaS) application.

In an embodiment, analytic services 106 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Data repository 118 includes volatile and/or non-volatile storage for storing data that is generated and/or used by analytic services 106. The datasets that are stored include:

Collected attributes 120, which comprises deployment parameters collected by collection logic 108;

Signature vectors 122, which comprises signature vectors that encode different parameter sets, which may vary in size;

Clustered results 124, which groups parameter sets and corresponding deployments into clusters; and Interface object 126, which comprises charts, graphs, annotations, summaries, and/or other elements to present to a user.

In some embodiments, data repository 118 is any type of storage unit and/or device (e.g., a file system, database, collection of tables, or any other storage mechanism) for storing data. Further, data repository 118 may include multiple different storage units and/or devices. The multiple different storage units and/or devices may or may not be of the same type or located at the same physical site. Further, data repository 118 may be implemented or may execute on the same computing system as one or more other components of system 100 and/or on a completely separate computing system. Data repository 118 may be communicatively coupled to analytic services 106 via a direct connection or via a network.

Clients 128a-k represent one or more clients that may access analytic services 106 to perform clustering and management operations as described further herein. A "client" in this context may be a human user, such as an administrator, a client program, or some other application instance. A client may execute locally on the same host as analytic services 106 or may execute on a different machine. If executing on a different machine, the client may communicate with analytic services 106 via one or more data communication protocols according to a client-server model, such as by submitting HTTP requests to invoke one or more of the services and receiving HTTP responses comprising results generated by one or more of the invoked services.

Frontend interface 116 may provide clients 128a-k with an interface through which one or more of the provided services may be invoked. Examples of interfaces include a graphical user interface (GUI), a command line interface (CLI), an application programming interface (API), a haptic interface, and a voice command interface. Examples of user interface elements include checkboxes, radio buttons, drop-down lists, list boxes, buttons, toggles, text fields, date and time selectors, command lines, sliders, pages, and forms.

Additional embodiments relating to computer networks and microservice applications are described below in Section 6, titled "Computer Networks and Cloud Networks", and Section 7, titled "Microservice Applications", respectively.

3. Clustering Software Entities by Parameter Sets

In some embodiments, analytic services 106 are configured to perform unsupervised cluster analysis of deployment parameters collected from a plurality of deployments of a software resource. Clusters may be formed based on learned patterns in the deployment parameters among different configurations of a software resource. These patterns may be hidden or not otherwise readily apparent, allowing inferences to be drawn that might be prohibitively expensive to determine from the raw deployment data.

Figure 2:
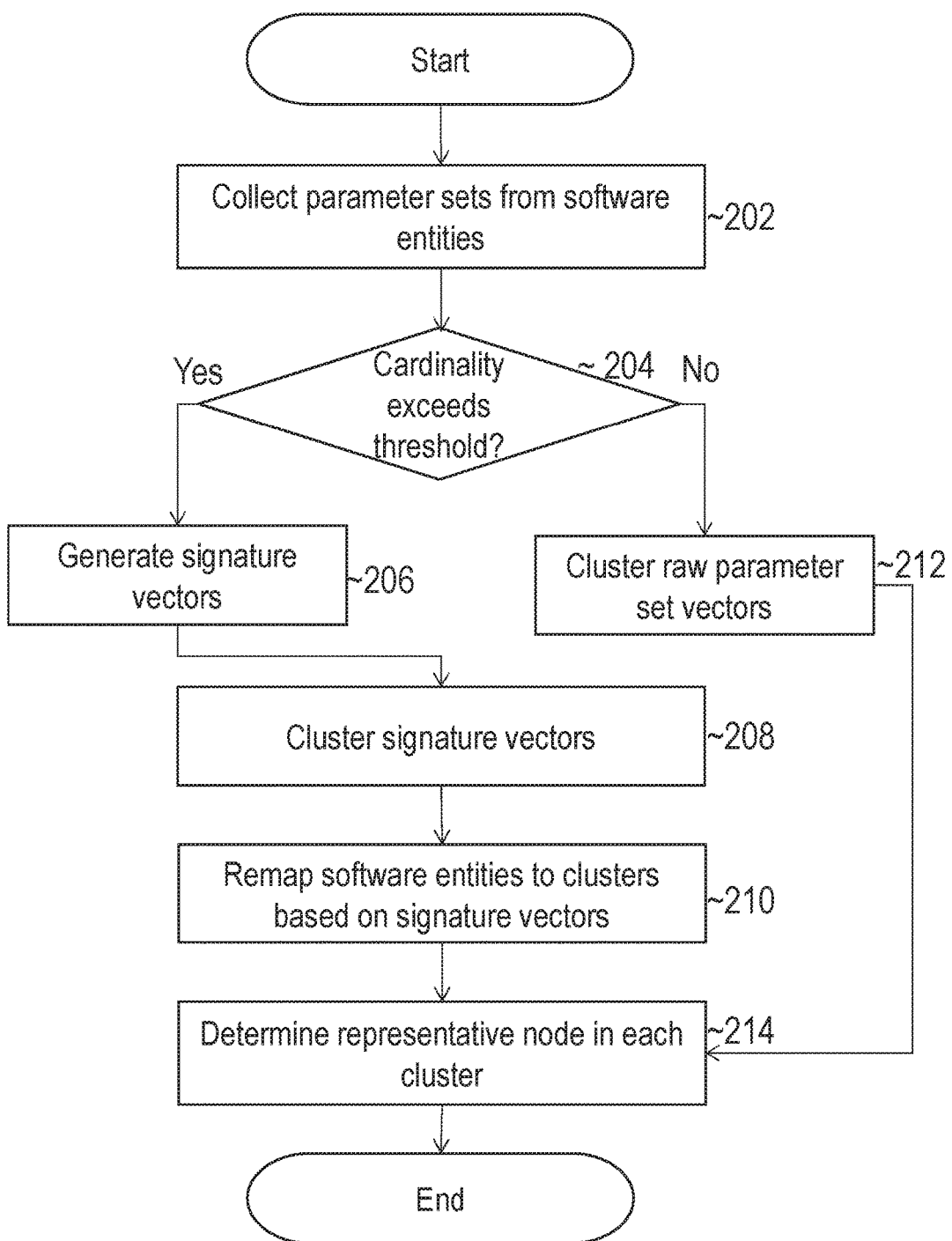
FIG. 2 illustrates an example set of operations for managing deployments of a software resource, in accordance with some embodiments.

FIG. 2 illustrates an example set of operations for managing deployments of a software resource, in accordance with some embodiments. Additional examples and embodiments for each of these operations are provided in further detail in subsections below. The set of operations comprises collecting parameters for a plurality of software entities (Operation 202). For example, collection logic 108 may collect configuration settings, static attributes, runtime attributes, and/or system architecture data from deployments of a particular software application or system.

In some embodiments, the parameter sets that are collected may vary in size from one deployment to the next. For example, collection agents may collect package inventories for various deployments of a software resource. As previously indicated, package inventories may vary greatly between different deployments. One software deployment may have dozens of software packages installed. A different deployment may have hundreds or thousands of software packages installed. Collection agents may therefore collect different numbers of parameters for different deployments.

Referring again to FIG. 2, the set of operations further comprises determining whether the cardinality of distinct entity configurations exceeds a threshold (Operation 204). The cardinality of distinct entity configurations based on the collected parameter sets. For example, one or more entities may have a distinct combination of software packages, such as compilers, development kits, windowing packages, and compatibility packages. Another set of one or more entities may have a different combination of software packages.

Distinct configurations may overlap in whole or in part. For example, a distinct configuration may include all or a portion of the software packages of another distinct configuration plus some additional software packages. In other cases, there may be no overlap between distinct configurations, such as if two software entities do not share any of the same software packages.

If the cardinality of distinct entity configurations exceeds a threshold, then clustering on the raw parameter sets may be too computationally expensive. For example, some applications may rely on clustering to be performed in sub-second time, which may not be feasible depending on the number of distinct configurations and available computational resources. In this case, the set of operations comprises generating a set of signature vectors for the distinct entity configurations. (Operation 206). As explained in further detail below, the signature vectors provide compression of the feature space and population space of the distinct entity configurations. Signature vectors may thus improve the scalability of clustering operations by reducing the number of elements that are compared and grouped.

If the cardinality of distinct entity configurations exceeds a threshold, the set of operations further comprises clustering the set of signature vectors (Operation 208). In some embodiments, the clusters are generated by forming a similarity matrix using the signature vectors. Spectral clustering may then be performed to group the signature vectors based on similarity. One approach for spectral clustering using tri-point arbitration is described in U.S. patent application Ser. No. 15/140,358, titled "Scalable Tri-Point Arbitration and Clustering", which was previously incorporated by reference. This approach may be used to automatically determine how many clusters to generate based on the tri-point arbitration coefficients of the similarity matrix.

In some embodiments, the set of operations includes mapping parameter sets and software entities to the clusters based on the signature vectors (Operation 212). A signature vector may map to one or more distinct entity configurations, and a distinct entity configuration may map to one or more software entities. Thus, a cluster of signature vectors may be expanded to a cluster of distinct entity configuration and/or a cluster of software entities. If clustering is performed on the raw parameter data, then there may be no signature vectors to map. In this case, the cluster of distinct entity configurations may be mapped to corresponding software entities.

If the cardinality of distinct entity configurations does not exceed a threshold, the set of operations comprises clustering the raw parameter vectors (Operation 212). As previously indicated, the parameter vectors may vary in size. A similarity matrix may be performed by calculating the Jaccard index of all parameter set pairs. The Jaccard index may be defined as the intersection set size divided by the union set size. A similarity matrix may then be created where the matrix elements are the Jaccard indices for all pairs of sets. Spectral clustering, such as described in U.S. patent application Ser. No. 15/140,358, titled "Scalable Tri-Point Arbitration and Clustering", may then be used to cluster the distinct entity configurations.

In some embodiments, signature vectors may be generated regardless of cardinality. For example, the cardinality check may be skipped, and the process may jump from operation 202 to operation 206. Operation 212 may thus be omitted or bypassed.

The set of operations further comprises determining a representative node in each cluster (Operation 214). The representative node for a cluster may be selected from an existing node or may be constructed as a new node for the cluster. In one or more embodiments, the representative node corresponds to the mode of the cluster. The mode in this context is the parameter set occurring most frequently in software entities assigned to the cluster.

Determining the mode may involve further excluding certain parameters that are either not relevant to the intended purpose of the representative node. As an example, a parameter may be excluded if it does not impact and/or is not impacted by upgrade or patching operations, which could be determined by looking at the parameters that are the subject of upgrade or patching operations. As another example, a parameter may be excluded if the parameter is not relevant to the functionality being analyzed, which may be determined based on whether the value is present in some systems having the functionality and absent in other systems lacking the functionality. The result is to determine the mode for the relevant subset of parameters.

In other embodiments, the representative node may be constructed or selected in some other way, such as by combining software packages that occur in more than a threshold number of software entities assigned to the cluster. Thus, the exact combination of software packages of a representative node may or may not occur in software entities assigned to the cluster.

Figure 3:
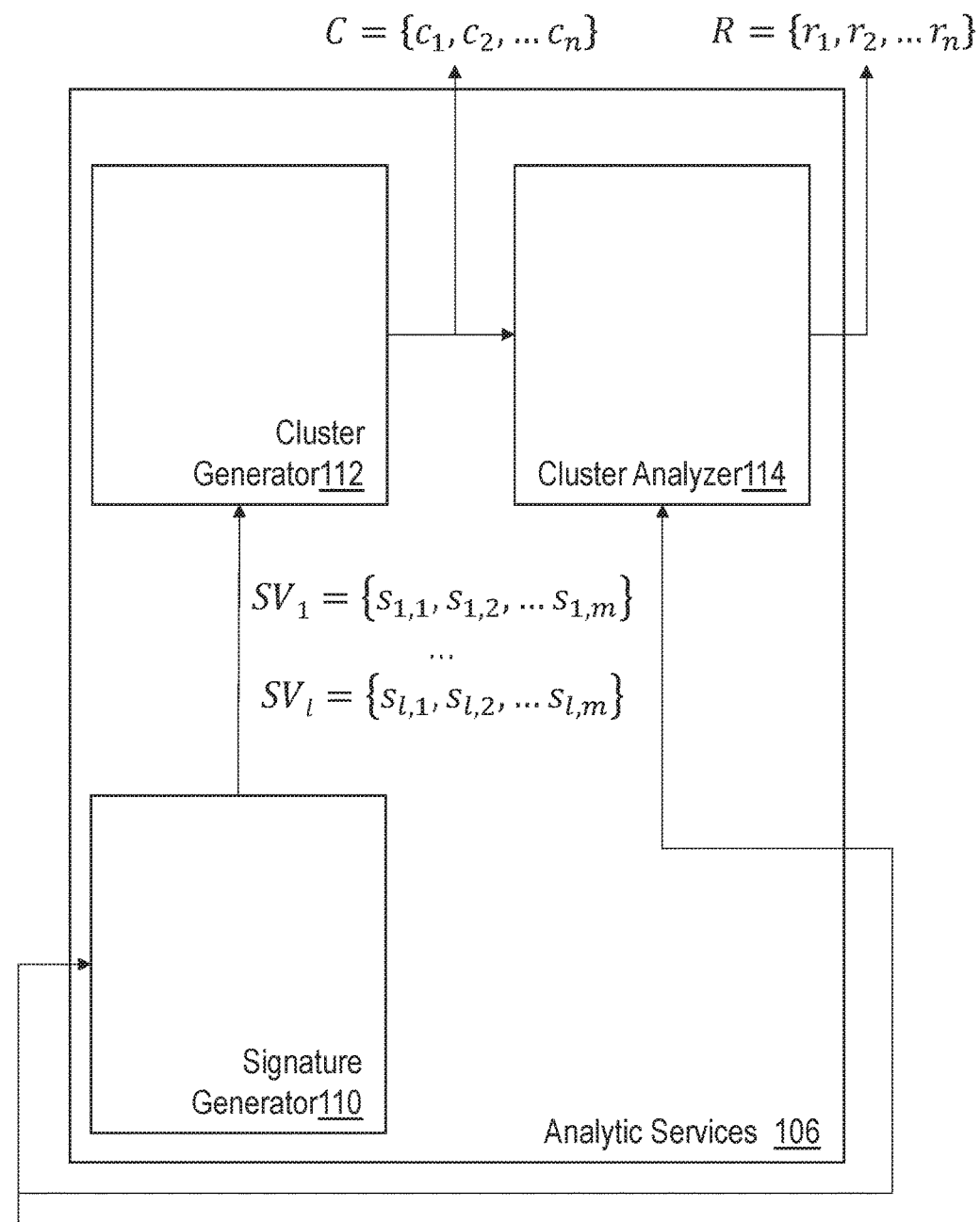
FIG. 3 illustrates an example dataflow diagram for generating a set of annotated clusters, in accordance with some embodiments.

FIG. 3 illustrates an example dataflow diagram for generating a set of annotated clusters, in accordance with some embodiments. Signature generator 110 receives a set of deployment parameters, denoted D, for multiple deployments of a software resource. The set of data points $\{x_{1,1}, \ldots, x_{i,k}\}$ may comprise parameter values for different deployment parameters. The parameter sets may vary in length from one software deployment to the next. Based on the deployment parameters, signature generator 110 creates a set of signature vectors, denoted SV, of a configurable-fixed length. Cluster generator 112 receives the signature vectors and generates a set of clusters denoted C. Each cluster in C comprises one or more nodes that correspond to distinct entity configurations. Cluster analyzer 114 determines a representative node for each cluster, which is identified in dataset R.

3.1 Signature Vector Generation and Compression

In some embodiments, parameter sets of variable lengths are converted into signature vectors of fixed-configurable length. Signature vectors allow for a software entity's feature space to be homogenized and compressed. As previously indicated, parameter sets for software deployments may be unknown and variable in size. Some parameter sets may include thousands or more parameters. Homogenization of the feature space is achieved by converting the parameter sets of varying size to signature vectors having the same size. Compression is achieved by reducing the length of a parameter set to a much smaller vector. For example, a host package inventory having 2,000 distinct values may be compressed into a signature vector having 50 or fewer elements.

Signature vectors also allow the population space to be compressed. The number of distinct entity configurations may be extremely large, presenting scalability challenges during clustering operations. The large population of distinct configurations may be significantly reduced by converting the parameter sets to signature vectors. For example, thousands of distinct software package sets within a datacenter environment may be represented by approximately dozens of distinct signature vectors.

In some embodiments, the population space is compressed by mapping different parameter sets that are similar to the same signature vector. The mapping may be accomplished through the use of locality-sensitive hashing (LSH), which is a class of hashing techniques that produces signatures that group similar sets together. An example of an LSH algorithm is MinHash, although other techniques may be used depending on the particular implementation. LSH functions such as MinHash may be configured such that parameter sets that are substantially similar map to the same signature vector. Thus, LSH functions are not configured to avoid collisions, unlike many hash functions. Rather, the LSH functions conceptually group similar signatures into buckets, where different signature vectors represent different respective buckets. Parameter sets that have significant overlap in parameter values may be mapped to the same signature. Parameter sets that have little or no overlap may be mapped to different signatures.

In some embodiments, a MinHash function is configured to receive a parameter set as input and to output a signature vector of fixed length. The MinHash function may apply n hash functions to an input set of parameters, where n corresponds to the length of the signature vector. The signature vector may be computed as follows:

$$SV = [f_{1/min}(X), f_{2/min}(X) \ldots f_{n/min}(X)]$$

where X is the input parameter set, which may vary in length, and $f_{1/min}(X)$, $f_{2/min}(X)$ ... $f_{n/min}(X)$ represent different hash functions that retain the minimum hash value obtained from applying the hash function to each member x of the parameter set X.

Another approach to MinHash is to use a single hash function and retain n members of a parameter set that have the smallest hash value. The subset of values from the parameter set may be used as a signature for the parameter set. The use of a single hash function to compute a MinHash signature is generally less computationally expensive then the use of multiple hash functions.

The length of the signature vector may vary depending on the particular implementation. A fixed length of approximately 30 was tested and heuristically determined to provide a sufficiently large compression of the population and feature spaces in large-scale software deployments. For example, tests on approximately 1,000 distinct parameter sets with 2,000 distinct values were able to be compressed to approximately sixty distinct MinHash signatures of 30 integers. However, other signature vector lengths may also be used depending on the particular application and/or available compute resources.

In some embodiments, the length of the signature vector may be adjusted during runtime based on a set of one or more thresholds. The set of one or more thresholds may be defined to ensure the scalability of clustering operations. For example, a default length, such as 30, may initially be selected for a signature vector. If too many distinct vectors are generated, then the clustering process may take too long depending on the application and the available compute resources. The length of the signature vector may be reduced, and the signature vectors may be regenerated. This approach increases the likelihood that more distinct parameter configurations will map to the same signature vector, thereby reducing the overall number of signature vectors. Generating signature vectors is generally computationally less expensive than clustering large numbers of signature vectors. Therefore, the added processing cost of regenerating signature vectors may be offset by the savings of clustering fewer signature vectors.

Figure 4:
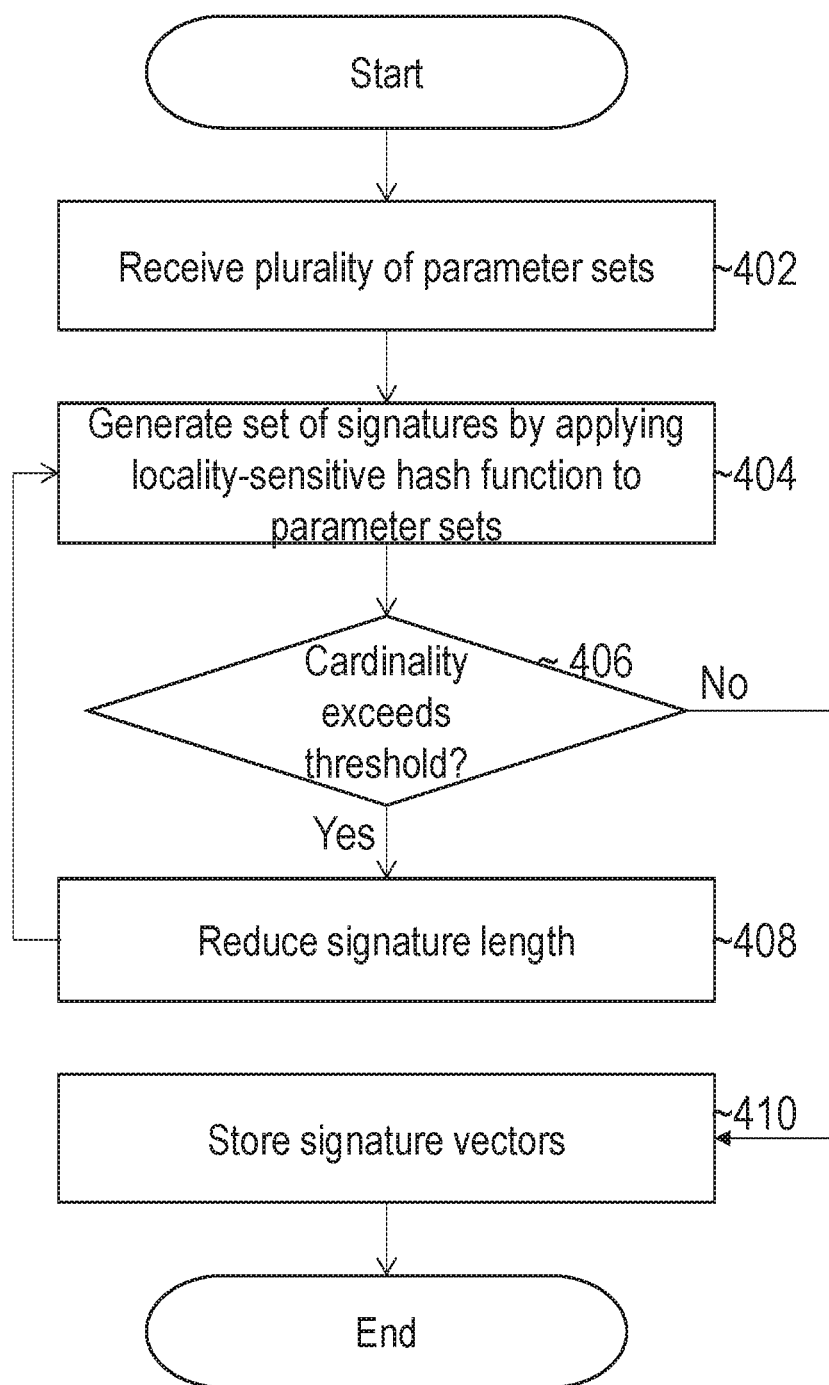
FIG. 4 illustrate an example set of operations for generating a set of signature vectors, in accordance with some embodiments.

FIG. 4 illustrate an example set of operations for generating a set of signature vectors representing parameter sets of software entities, in accordance with some embodiments. The set of operations includes receiving a plurality of parameter sets (Operation 402). The parameter sets may identify configurations for various software entities, which may correspond to different deployments of a software application. For example, an individual parameter set may identify the package inventory installed on a corresponding software entity. A parameter within a parameter set may identify an individual software package in the package inventory. Additionally or alternatively, parameters within a parameter set may identify other configuration settings such as security settings, network settings, and patch set updates that have been applied to a target resource.

Referring to FIG. 4, the set of operations further includes generating a set of signature vectors by applying an LSH function to each parameter set (Operation 404). For example, a MinHash function may be applied to each parameter set as previously described. The output of the MinHash function is a set of signature vectors of fixed length.

In some embodiments, the set of operations further includes determining whether the cardinality of the signature vectors exceeds a threshold (Operation 406). If the total number signature vectors exceeds a threshold, then clustering operations may be difficult to perform in a performant manner, such as in sub-second time, depending on available compute resources. A threshold of 100 signatures or less is generally scalable in datacenter environments, but the threshold may vary depending on the particular implementation.

If the cardinality of the signature vector exceeds a threshold, then the set of operations includes reducing the signature length (Operation 408). The signature length may be reduced by adjusting the parameter n of the MinHash function, thereby reducing the number of hash functions that are applied to the parameter sets. The amount of the reduction may vary depending on the particular implementation. In some embodiments, the signature vector is reduced by a fixed amount, such as one or more elements, each pass. In other embodiments, the signature may be reduced as a function of how greatly the cardinality threshold is exceeded such that the signature length is reduced more severely the larger the number of signature vectors over the threshold. This approach may reduce the number of passes that are performed to obtain a final set of signature vectors.

After the signature length is reduced, the process returns to operation 404, and the signature generation is repeated. This process may be repeated until the distinct signature set does not exceed the threshold cardinality. Once the cardinality threshold is satisfied, the set of operations includes storing the final set of signatures (Operation 410). In some embodiments, an index is maintained that maps the signatures to corresponding parameter sets. As previously indicated, one signature vector may map to one or more parameter sets, which may vary in size. The index may facilitate remapping software entities during clustering operations.

3.2 Parameter Filtering

In some embodiments, filters may be provided to exclude parameters from the signature generation process. Excluding parameters reduces the parameter set size, which may increase scalability. Filters may also be useful to remove parameters that have no bearing on similarity or that may skew the similarity analysis. For example, a software package that is common across all software entities may be filtered from the parameter set since universal parameters may not be used to differentiate different groups of deployments. As another example, a user may wish to give little to no weight to a software package for purposes of clustering.

A filter may explicitly identify parameters and/or include a set of filter criteria. For example, the filter may explicitly identify software packages by name and version number that should be excluded. As another example, a filter may exclude software packages that meet a set of filter criteria, such as any filter that is common across all deployments of a software resource. Other filter criteria may be specified based on one or more attributes, such as the size and/or functionality of a software package.

In some embodiments, a filter may identify parameters that should be retained. For example, a filter may explicitly identify parameters to retain based on names and/or other identifiers. Additionally or alternatively, a filter may specify a set of filter criteria that may be matched against parameters within a parameter set. Parameters that do not match the filter criteria may be excluded from the signature generation process.

In some embodiments, filters are configurable by an end user. For example, the user may provide a curated list of parameters to include and/or exclude. This approach allows the user to inject domain knowledge into the system to tailor the signature generation and clustering process to custom applications.

In some embodiments, filtering is applied during the collection and/or signature generation process. During the collection process, the collection agents may collect only parameters that satisfy a set of collection filters. This approach may reduce the overhead of collecting parameters that are superfluous or otherwise unnecessary for the clustering process. In the signature generation process, parameters may be removed from the parameter set that do not satisfy a set of signature filters. The filtered parameters are not used for clustering purposes. However, these parameters may be useful for analytic purposes, such as to compare differences between software entities, as described in further detail below.

3.3 Cluster Generation

One approach to clustering parameter sets is to create a similarity matrix whose elements are the Jaccard indices for all pairs of sets. While this approach provides an accurate similarity matrix, it may be prohibitively expensive in terms of compute time and resources, especially as the parameter set sizes and number of distinct parameter sets increases. A similarity matrix may instead be generated from the distinct signature vectors. The reduction of the feature space and population space allows similarity matrix to be formed with much less computational overhead. A benefit of using LSH techniques, such as MinHash, to produce signature vectors is that a similarity matrix of signature vectors is effectively a similarity matrix for groups of distinct sets. As a result, the Jaccard index of the signature vectors may accurately approximate the Jaccard index of the original parameter sets.

As previously indicated, a similarity matrix may be formed such that the elements of the matrix are Jaccard indices of different signature vector pairs. That is, for a given matrix element $M_{i,j}$, the Jaccard index may be computed as $$J(S_i, S_j) = \frac{|S_i \cap S_j|}{|S_i \cup S_j|}$$

where $S_i$ is a signature vector corresponding to row i of the similarity matrix, $S_j$ is a signature vector corresponding to column j of the similarity matrix, and $J(S_i, S_j)$ is the Jaccard index for the signature vector pair computed as the intersection set size divided by the union set size.

In some embodiments, spectral clustering is performed to group elements of a similarity matrix. One approach for spectral clustering is described in U.S. patent application Ser. No. 15/140,358, titled "Scalable Tri-Point Arbitration and Clustering", previously incorporated by reference. This approach uses tri-point arbitration to automatically select an optimal number of clusters. In other embodiments, the number of clusters may be predefined. However, it may be difficult to predefine the optimal number of clusters when parameter sets evolve over time as software entities are deployed and updated.

Figure 5:
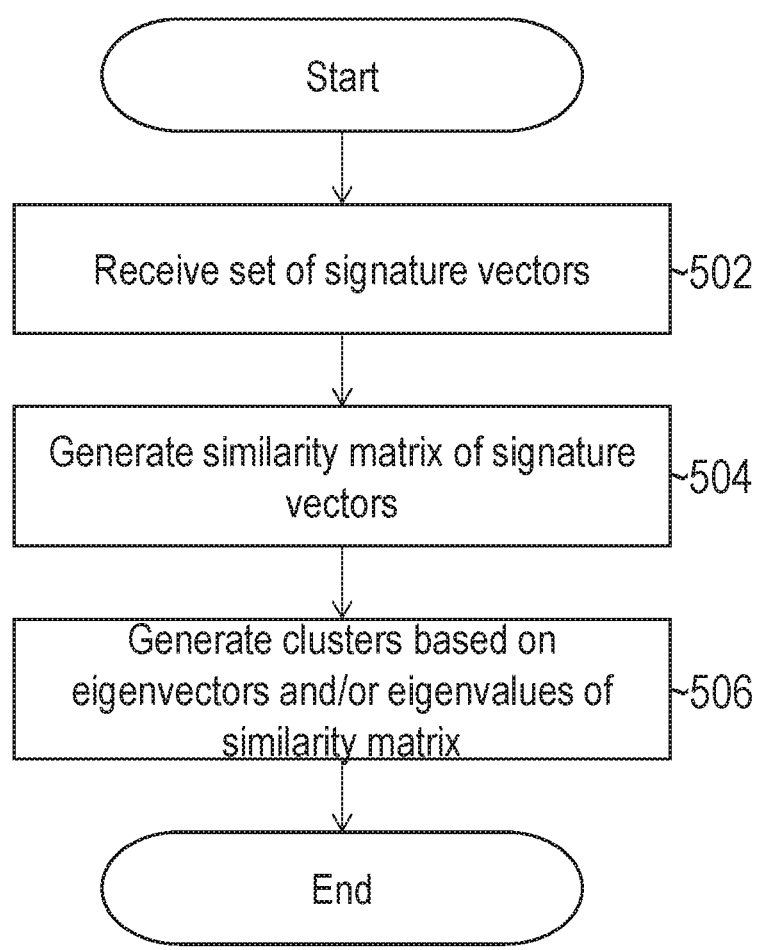
FIG. 5 illustrates an example set of operations for clustering a set of software entities, in accordance with some embodiments.

FIG. 5 illustrates an example set of operations for clustering a set of software entities, in accordance with one or more embodiments. The set of operations includes receiving a set of signature vectors (Operation 502). For example, a set of MinHash signature vectors may be fetched from volatile and/or non-volatile memory during this operation.

The set of operations further comprises generating a similarity matrix of signature vectors (Operation 504). The similarity matrix may be generated by computing the Jaccard index for each signature vector pair, such as previously described. The result is an n×n matrix, where n represents the total number of signature vectors and each element is a Jaccard index of a different respective signature vector pair.

Once the similarity matrix has been generated, the set of operations includes clustering the signature vectors based on the eigenvalue and/or eigenvectors of the similarity matrix. (Operation 506). Techniques for clustering based on the eigenvalues and eigenvectors of the similarity matrix are described further in U.S. patent application Ser. No. 15/140, 358, titled "Scalable Tri-Point Arbitration and Clustering".

In some embodiments, the set of operations further comprises remapping the clusters to the corresponding parameter sets. As previously described, a signature vector may map to one or more distinct parameter sets. A node in the signature vector cluster may thus be expanded to two or more nodes in a final set of clusters, such that each node in the final set of clusters represents a distinct parameter set.

3.4 Cluster Summaries and Representative Nodes

In some embodiments, cluster analyzer 114 is configured to generate a summary for each cluster. A summary may comprise information about hidden patterns or other information about the cluster that may be useful for configuration management. For example, a summary may identify an intersection complement of a cluster. The intersection complement may be defined as the parameters that are in all cluster members and not contained in common parameters of all other clusters. For example, an intersection complement may include software packages installed on software entities assigned ton one cluster that are not installed on software entities assigned to another cluster.

Additionally or alternatively, a summary may identify a representative node for the cluster. In the context of a cluster of parameter sets, the representative node may be selected as the most frequently occurring parameter set detected in software entities assigned to the cluster. The representative node may be selected as a gold/recommended parameter set for other nodes assigned to the cluster. For example, the representative node may correspond to a recommended set of software packages for all software entities assigned to the cluster.

In other embodiments, the representative node may be constructed from a combination of the most frequently occurring parameters. For example, the representative node may include all software packages that occur in more than a threshold number or percentage of software entities assigned to the cluster. The entire combination of software packages may not be installed on any individual node, but may still represent a recommended level of configuration.

Figure 6:
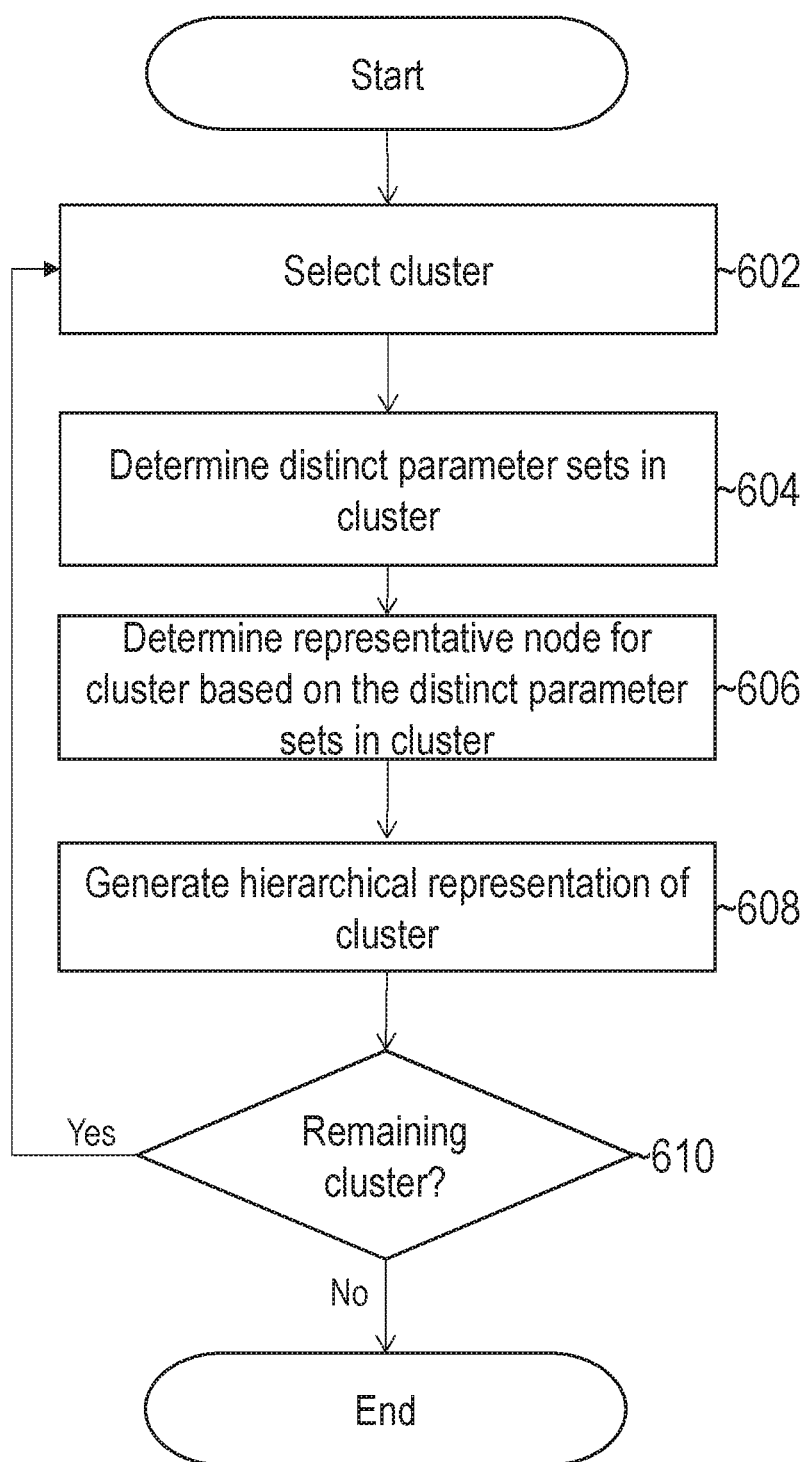
FIG. 6 illustrates an example set of operations for summarizing a set of clusters, in accordance with some embodiments.

FIG. 6 illustrates an example set of operations for summarizing a set of clusters, in accordance with some embodiments. The set of operations includes selecting a cluster (Operation 602). The clusters may be analyzed in any order. For example, cluster analyzer 114 may select the first cluster $c_1$ from dataset C or start with any other cluster in the dataset.

The set of operation further comprises identifying distinct parameter sets within the cluster (Operation 604). In some embodiments, each node in a cluster represents a distinct parameter set. A list of parameters may be maintained for each node that identifies the members of the parameter set.

The set of operations further comprises determining a representative node for the cluster based on the distinct parameter sets in the cluster (Operation 606). In some embodiments, the representative node may be selected as the node in the cluster corresponding to the largest number of software deployments. In other embodiments, the node may be constructed as a new node rather than being selected from an existing node, such as previously described.

The set of operations further comprises generating a hierarchical representation of the cluster (Operation 608). In some embodiments, the hierarchical representation is a graph that is computed based on diffs of each non-representative node in the cluster. The graph may be recursively built to describe the structure of how the configurations differ from the representative node. The hierarchical graph may identify complete paths to each distinct configuration/state of software deployments in the cluster. The hierarchical graph may also identify any common intermediate observed configurations/states. The graph may provide a convenient interface for up-levelling by having intermediate states. The graph may be recursively collapsed or expanded based on user interests and preferences.

The set of operations includes determines whether there are any remaining clusters to analyze (Operation 610). If so, then the process repeats for the next selected cluster. If there are no remaining clusters to summarize, then the process ends.

4. Interactive Interfaces for Configuration Management

One or more interactive interfaces may be generated based on the set of summarized clusters. The interactive interfaces may allow a user to visualize, navigate, and otherwise access summary information about a cluster. Additionally or alternatively, the interactive interface may provide a user with options for performing one or more management operations based on the cluster results/summary. Example that may be launched through the interactive interfaces provided herein are described in Section 5, titled "Configuration Management".

Subsections 4.1 to 4.4 provide examples of interactive interfaces and visualizations that may be generated from a clustered set of results. The interactive interfaces and visualizations may facilitate configuration management in various ways. For example, the interactive interfaces may allow configuration drift between similar target resources to be quickly identified through intuitive visualizations and efficiently remediated. As another example, the interactive interfaces may allow security vulnerabilities and performance degradation to be quickly identified and resolved. The example interfaces and visualizations depicted below are provided for purposes of illustration only. The presentation and format of the interactive interfaces and visualizations may vary from implementation to implementation.

4.1 Cluster Visualizations and Interfaces

Figure 7:
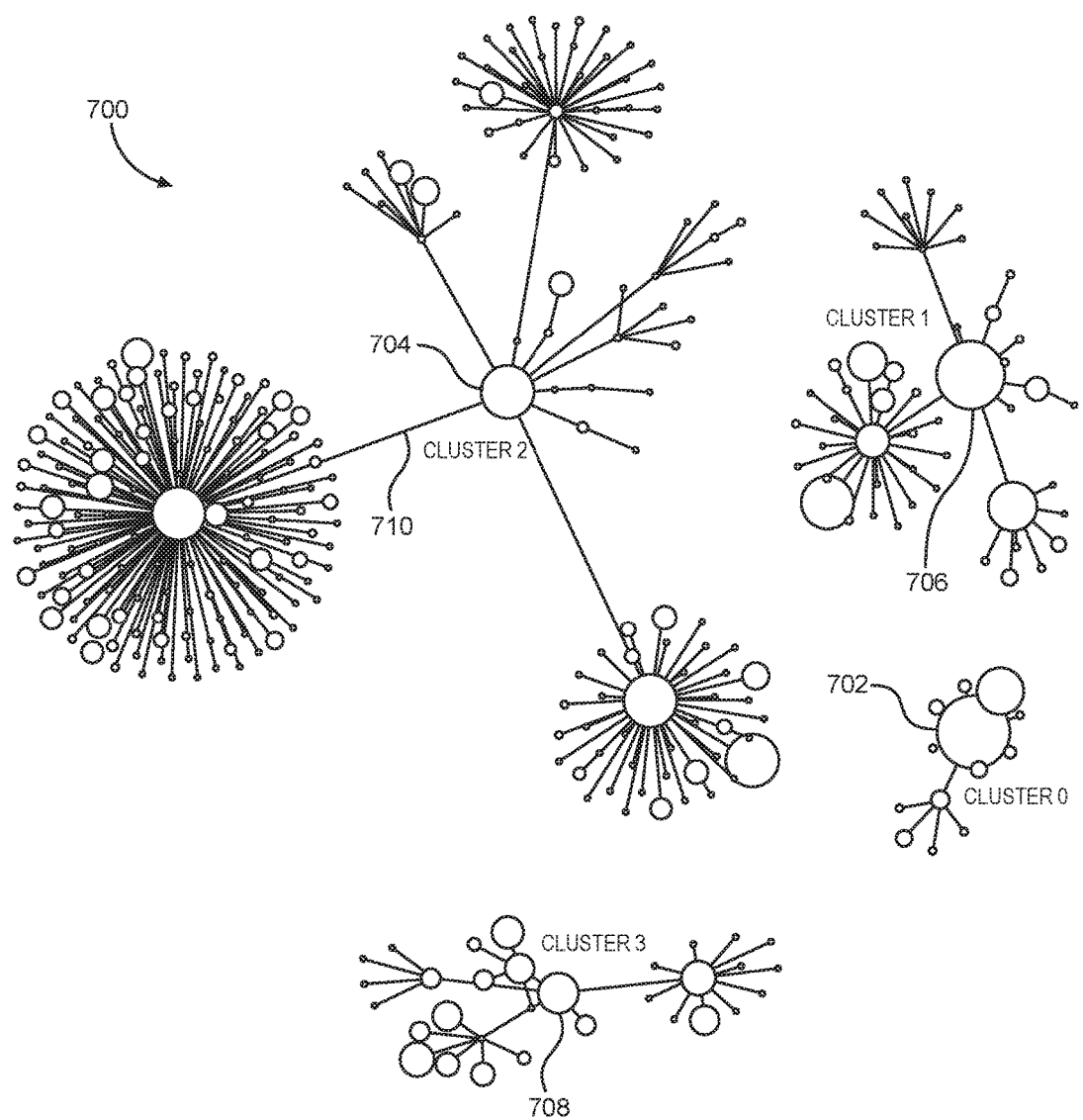
FIG. 7 illustrates an example interactive visualization of a set of clusters, in accordance with some embodiments.

In some embodiments, cluster visualizations include graphical representations of a set of nodes and edges. The graphical representation may be generated based on the hierarchical graph generated for the clustered results. A node in a cluster visualization may represent one or more target resources and a unique combination of parameters such as package installations. Edges connect different nodes that have been assigned to the same cluster. For example, FIG. 7 illustrates example interactive visualization 700 of a set of clusters. Interactive visualization 700 displays cluster 0, cluster 1, cluster 2, and cluster 3. Each cluster includes a plurality of nodes or vertices corresponding to different instances of the clustering feature set.

In some embodiments, a representative node is selected for a cluster. For example, the representative node may be selected as the most frequently occurring instance of a feature vector or may be constructed as previously described. The representative node may correspond to a gold image or recommended configuration for deployments assigned to the cluster. Referring to FIG. 7, for instance, the gold image representation for clusters 0-3 are nodes 702, 704, 706, and 708, respectively. The representative node may be visually highlighted to facilitate identification. For example, the representative node may be displayed in a separate color from other nodes in the cluster. Additionally or alternatively, the representative node may be displayed with a larger size and/or annotated.

In some embodiments, the size of a node/vertex in the graph is displayed as a function of the number of software deployments having the combination of parameters corresponding to the node. For example, the size of the node may be proportional to the log of the number of software deployments. Thus, nodes corresponding to a greater number of software deployments may have a larger display size/area than those corresponding to fewer deployments. The representative node may have the greatest display size of the nodes in the cluster.

In some embodiments, nodes that belong to the same clusters are connected by edges, which may be graphically represented as a line. For example, the representative nodes for each cluster (nodes 702, 704, 706, and 708) are each connected to a plurality of other nodes representing different parameter sets. These nodes may also be connected by edges to other nodes, supporting hypothetical clusters as described further in subsection 4.2.

The edge length between nodes in FIG. 7 may be arbitrarily selected to fit the display based on the display resolution. In other embodiments, the edge length may encode the distance between the vectors that represent the two nodes. For example, the edge size may increase proportionally with the Euclidean distance of two nodes. Thus, nodes that are relatively similar are displayed closer together than nodes that are relatively different with respect to other nodes in the cluster.

In some embodiments, the nodes of a cluster are interactive, allowing a user to quickly access information about a set of deployments and initiate management operations. For example, a user may click on or otherwise select a node, such as node 704, to view information about deployments associated with the node. Example information that may be presented may include a list of parameters represented by the node, the number of deployments assigned to the node, the geographic location or locations of the deployments within the node, and/or attributes that are common to the deployments associated with the node. As another example, a user may be presented with a list of target deployments and collected configuration settings for each target deployment upon selecting a node. In yet another example, a user may be provided with a set of available management operations upon selecting a node. The user may then select a management operation to perform with respect to the selected node. Example management operations are described further below in Section 5, titled "Configuration Management".

Additionally or alternatively, the edge between two nodes in the graph may be interactive. For example, a user may select an edge to identify differences between different portions of a cluster. Referring to FIG. 7, for instance, selecting edge 710 may cause a comparison between different parameter values to be displayed. For example, upon selecting an edge, a comparison of differences in the installed software packages may be presented. Selecting an edge may allow a user to perform one or more operations with respect to the nodes and/or sub-clusters connected by the edge. For example, differences between two nodes may be reconciled through an update operation in some cases.

Additionally or alternatively, entire clusters and/or groups of nodes may be interactive. For example, a user may select one of clusters 0-3 to drill-down and view more information about the cluster or to perform management operations with respect to the cluster. As another example, a user may select a subset of nodes in a cluster to view node relationships and execute management operations against the nodes. The interface may thus allow a user to perform operations at various levels of granularity. Executing management operations against large groups of nodes provides for efficient bulk operations. At the individual node level, more tailored operations may be executed.

4.2 Hypothetical Clusters and Representative Node Changes

In some embodiments, cluster interfaces may facilitate the identification and performance of operations on hypothetical clusters. A hypothetical cluster in this context refers to a sub-cluster within a cluster that shares common parameters, such a installed software packages. The parameters that are common to a hypothetical cluster may differ from parameters of other nodes in the same cluster, such as nodes belonging to other sub-clusters.

In some embodiments, a hypothetical cluster may be sub-cluster that is connected to the representative node for a cluster. For example, edge 710 connects the representative node 706 with a corresponding sub-cluster. While representative node 706 has been selected as the gold standard, the sub-cluster supports a hypothesis for an additional cluster. The nodes of the sub-cluster share a common set of parameters. These parameters, common to the sub-cluster, may be different from the representative node for the cluster and other sub-clusters within the cluster. Other hypothetical clusters are also connected to nodes 704 in addition to the sub-cluster connected by edge 710.

In some embodiments, each hypothetical cluster includes a node that is representative of a sub-cluster, which is referred to herein as a hypothetical representative node. The hypothetical representative node is directly connected to the representative node for the entire cluster. For example, edge 710 connects the hypothetical representative node for one hypothetical cluster. The hypothetical representative node may be selected as the most commonly occurring parameter set within the sub-cluster. Additional nodes in the sub-cluster may be connected directly to the hypothetical representative node rather than the representative node for the cluster.

In some embodiments, a hypothetical cluster may run multiple levels deep. For example, a hypothetical representative node (the "parent" node) may be connected to the representative node for the entire cluster. Another hypothetical representative node (a "child" node) may be connected to the hypothetical representative node for the hypothetical cluster. This scenario may occur when a significant number of nodes share the common parameters with the parent node of the primary hypothetical cluster but also may be subdivided along other distinct parameters. Thus, the hypothetical clusters may facilitate identification of common groups of parameters among different target deployments at multiple levels of granularity.

In some embodiments, hypothetical clusters may be separated from the main cluster to form a new cluster. For example, a user may sever this sub-cluster along edge 710 to create a new cluster from the sub-set of nodes that belong to the sub-cluster. The center/mode for the subset of nodes may then be assigned as the representative node for the new cluster. The initially selected representative node may remain the representative node for the nodes that were not severed.

In some embodiments, the interface allows a user to change the representative node of a cluster and/or a hypothetical cluster. For example, a user may right click or otherwise select a node in the cluster other than the representative node. The user may then be presented with an option to set the node as the representative node. In response to the selection, the representative node may be changed to the selected node. The visualization may be updated to highlight the new representative node. Additionally or alternatively, one or more edges may be redrawn to connect to the new representative node rather than the previous representative node. This approach may be useful when the optimal configuration is followed by relatively few deployments in the cluster or a new node/deployment is introduced. In these cases, the auto-selected representative node may be updated to match the new node.

4.3 Summary Visualizations

In some embodiments, a user may drill-down on individual clusters and/or nodes to view more detailed information. For example, the user may select one of clusters 0-3 to view a more detailed interactive visualization for the cluster. Additionally or alternatively, a user may select individual nodes to identify which software deployments are associated with a node. For example, selecting a node may cause an identifier to be displayed for each software deployment sharing the parameter set corresponding to the node.

In some embodiments, differences in node configuration are displayed next to a node or an edge. For example, a summary may be displayed next to a node that indicates that which software packages are different between the two nodes. The summary allows a user to quickly gain an understanding of how different software entities have been configured.

Summaries may help bring to light different installation patterns on different software entities. For instance, different installation patterns may emerge for different development environments. As another example, different installation patterns between different types of environments, such as production and test environments, may be quickly isolated and analyzed.

Figure 8:
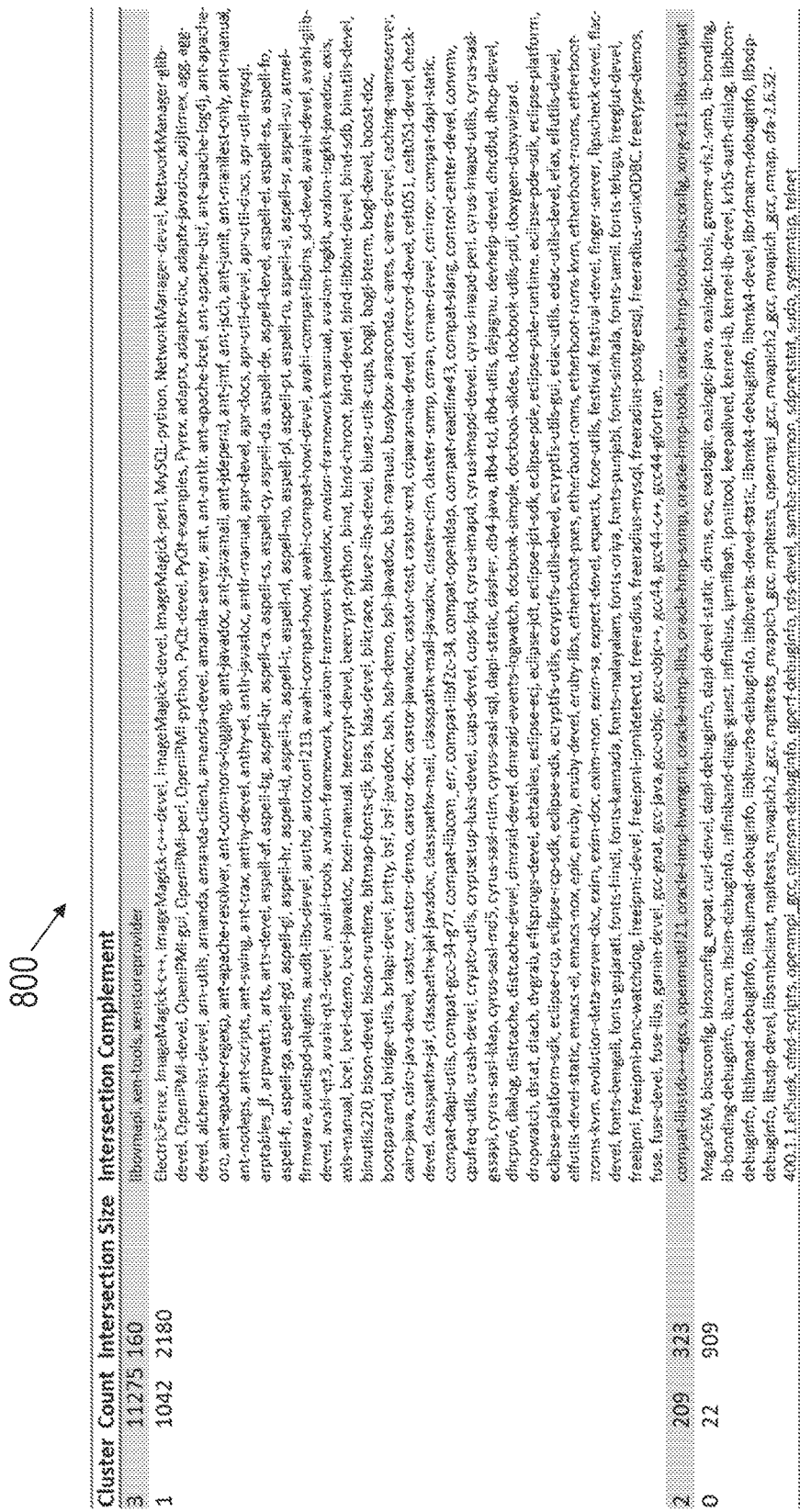
FIG. 8 illustrates an example summary of a set of clusters, in accordance with some embodiments.

FIG. 8 illustrates example summary chart 800 for a set of clusters, in accordance with some embodiments. The summary chart includes cluster identifiers, count values, the intersection size, and the intersection complement for each cluster. The count value indicates how many software entities are in a cluster. The intersection size corresponds to the number of parameters in all of the cluster members. The intersection complement identifies parameters that are in all cluster members and not contained in common parameters of all other clusters.

Summary chart 800 depicts four distinct clusters. Cluster 3 represents a standard configuration and has the largest population with 11,275 software entities. The inventory size and intersection complement for this cluster is modest in comparison with the other clusters. Cluster 1 groups software entities used for development and testing. This cluster has the largest common inventory. The inventory complement includes several software packages such as a java compiler (gcc-java) and standard development kits (eclipse-platform-sdk). Cluster 2 groups legacy software entities together. The intersection complement includes legacy windowing software packages and compatibility packages. Cluster 0 groups high-performance software entities together. The intersection complement includes high-performance software packages such as Exalogic and Infiniband software packages.

4.4 Drag-and-Drop Interface

In some embodiments, the interactive visualizations support a drag-and-drop interface to perform management operations. A drag-and-drop interface allows a user to click on or otherwise select graphical representations, such as icons, of one or more nodes in a cluster. The user may drag the graphical representations and drop the graphical representations of the one or more nodes to another area of the display. The user may then drop the graphical representations, such as by releasing the clicked button, to initiate one or more management operations on the node. Drag-and-drop may provide an intuitive interface for managing the configuration of a large number of objects.

In some embodiments, one or more management operations are triggered responsive to a user dragging-and-dropping one or more nodes to another node. For example, the user may drag one or more nodes to the representative node or any other node in the cluster. In response, an update operation may be triggered to reconcile the node that was dragged with the representative node. The update operation may involve installing software packages and/or adjusting other parameters of software entities corresponding to the node such that the updated parameter set matches that of the representative node.

Additionally or alternatively, the management operations may be triggered via other interfaces or automatically, depending on the particular implementation. For example, the user may trigger management operations through a menu interface, a CLI, or through any other user interface. The interface may allow a user to initiate several operations in parallel on different deployments with minimal input, such as a drag-and-drop or a single click.

5. Configuration Management

In some embodiments, management operations may be triggered automatically or on-demand based on the results of a clustering process. Example management operations may include:

Initializing new nodes/deployments;
Updating existing nodes/deployments
Remediating drift within clustered nodes
Subscribing nodes to a gold image
Performing analytics; and
Performing troubleshooting.

Example embodiments of management operations are provided below in subsections 5.1 to 5.5

As provided in the examples below, a management operation's functionality may be dependent on one or more values of the parameter set of the representative node or other characteristics of the representative node, either by causing display of information from the parameter set on an interface, for example, in association with the representative node or its cluster, or by using such information to drive the targeted performance of a remedial operation, maintenance operation, or some other operation with respect to the representative node or its corresponding cluster. For example, any operation that requires the cluster to be treated as if it were a single node (e.g., for visualization purposes, to simplify software configuration complexity, or otherwise) could take advantage of one or more values of the parameter set of the representative node or any other characteristics of the representative node, even if those characteristics were not used for the purposes of generating the clusters. This information may be provided to the service executing the operation.

5.1 Initializing New Nodes

In some embodiments, the results of a clustering operation may be used to initialize new nodes. When a new deployment of a software resource comes online, the new deployment may be assigned to a cluster based on the initial parameters. The configuration settings may then be set to match those of the representative node in the cluster.

In some embodiments, initialization of a new node is performed automatically. When a new deployment is first detected, a signature vector may be formed based on the parameter set associated with the new deployment. The signature vector may be used to assign the deployment to a cluster based on similarity between the signature vector to the signature vectors of each cluster. The parameter set of the representative node may then be determined and applied to the new node. For example, the new node may lack one or more software packages of the representative node. In this case, an installation process may be triggered on the new node to install the software packages. As another example, the security settings on the new node may be configured to match the representative node, such as by opening or closing network ports, configuring identity and access management policies, and/or updating firewall settings.

In other embodiments, initialization of a new node may be done by request. For example, the user may drag-and-drop a graphical representation of the new node on the representative node or any other node in a cluster. In response, a set of one or more processes may be launched on the new node to update the parameter set to match those of the representative node.

5.2 Updating Nodes and Remediating Drift

In some embodiments, the results of a clustering operation may be used to update nodes in a cluster. For example, a node or group of nodes within a cluster may be updated, either automatically or by request, to match the parameter set for the representative node or any other node in the cluster. Responsive to receiving a request to update a node or set of nodes, one or more update and/or install processes may be instantiated. The update process may apply patches to modify a software binary, execute scripts to modify initialization parameters, or otherwise update configuration settings. Install process may be configured to install software packages on the software entities. Updates and/or installs on multiple nodes may be executed in parallel.

In some embodiments, update operations may add features to the deployments that were present in the representative node but initially missing from the upgraded nodes. For example, an update operation may add user-defined patches, scripts, or other custom features to a deployment. The clustered set of results may thus be used to update the set of source components from which one or more deployments are run.

In some embodiments, update operations may be performed to remediate configuration drift within a cluster. For example, nodes that belong to the same cluster may be updated, either automatically or by request, to match the configuration of the representative node in the cluster. Drift reconciliation may be applied to a single node in the cluster, to a subset of nodes, or to all the nodes in a cluster. The system may provide the user with a time estimate on the operation. Updates may be scheduled and/or staggered to mitigate downtime.

Remediation may be performed globally for all nodes within a cluster or for a subset of nodes therein. In some embodiments, remediation may be performed on a hypothetical cluster basis. As previously described, a hypothetical cluster has a hypothetical representative node that is different than the representative node for the entire cluster. The user may select an option to use the hypothetical representative node to remediate drift in a sub-cluster rather than the global representative node. This approach allows the user to reconcile different sub-clusters using different configuration settings based on how the nodes are organized into sub-clusters.

5.3 Gold Image Subscriptions

In some embodiments, the results of a clustering operation may be used to generate gold image subscriptions. For example, a representative node may be selected, either automatically or by a user, as a gold image for one or more other nodes in the cluster. In response, a set of subscription data is generated that maps the subscribed nodes to the gold image. Once subscribed, the nodes follows changes to the representative node. Thus, an upgrade detected at the representative node may trigger upgrades to subscribed nodes/deployments.

In some embodiments, all nodes within a cluster are subscribed to the representative node for the cluster. However, in other embodiments, different subsets of nodes within a cluster may subscribed to different gold images. For example, nodes that belong to a hypothetical cluster may subscribe to the hypothetical representative node for the sub-cluster rather than the representative node for the entire cluster. In other cases, the user may select a gold image from any of the other existing nodes in the cluster or may create a new gold image node with a new set of features.

5.4 Analytic Operations

In some embodiments, analytic operations may be run over one or more nodes in a cluster to display analytic information about the nodes. Analytic operations may be used to gather insights about target deployments that would not be readily apparent outside of the context of the clustered set of results. As an example, aggregate performance metrics, such as average CPU utilization and memory throughput, may be presented for different parameter set groupings. As another example, dispersion rates that present the variability of feature values in a cluster or sub-cluster may be presented. Other analytic operations may also be executed as a function of one or more features of nodes in the clusters.

In some embodiments, analytic operations may be performed to highlight differences between different clusters and/or sub-clusters. Displaying information about a small set of representative nodes may allow for a clearer understanding of the different purposes of the different clusters in the system. For that reason, a presentation of information about different clusters (or hypothetical clusters) may focus on differences. Characteristics shared by all representative nodes (or hypothetical representative nodes) may be excluded from presentation of information.

In some embodiments, analytic information may be presented to a user to facilitate management operations. As an example, in response to a user selecting a node in a cluster, the interactive interface may display information about how the node drifts from the representative node. For instance, the information may include a list of software packages that differ from the representative node, such as differences in patch-levels and security settings. Additionally or alternatively, the information may include a cost estimate of reconciling the node with the representative node. The cost estimate may be determined based on the steps required to update the configuration settings of the node to match the representative nodes. The cost estimate may include an estimated time to perform the steps, which may help the user schedule a management operation for at an appropriate time.

5.5 Troubleshooting Operations

Fixing a problem with one node is often easier than fixing an entire cluster. If, through a visualization of the clusters and the representative nodes, a user is able to determine that a particular cluster has a problem, then the user may attempt to troubleshoot the representative node, track configuration changes being made to the representative node, and, when troubleshooting is complete, apply any such changes to the entire cluster. For example, a problem may be detected based on frequently occurring bug reports in the cluster, frequently occurring error logs associated with the cluster, or poor performance metrics for the cluster or based on metrics displayed concurrently with the cluster that indicate the problem. The user may leverage the information presented about the cluster to isolate and address the root cause of the problem.

In some embodiments, the interactive interfaces allow a user to take ameliorative action when attempting to resolve a problem, such a performance degradation or security violations. For example, the user may shut down one or more nodes in a cluster to prevent further security violations. The user may then bring the nodes back online once the problem has been resolved on the representative node. Any configuration changes made on the representative node may be propagated to the other nodes before they are brought back online. For example, the nodes that belong to a cluster may apply any patches, security setting updates, or other configuration changes made to the representative node.

6. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with some embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a plurality of parameter sets of varying lengths, wherein a parameter set in the plurality of parameter sets identifies attributes of a target resource;
generating a plurality of signature vectors based on the plurality of parameter sets, wherein the plurality of signature vectors have equal lengths, wherein at least one signature vector of the plurality of signature vectors maps to two or more parameter sets of the plurality of parameter sets;
generating a plurality of clusters that group distinct parameter sets of the plurality of parameter sets based on similarity between the signature vectors;
performing an operation on a target resource based on at least one node in the plurality of clusters.

2. The method of claim 1, wherein the at least one node in the plurality of clusters is a representative node for a particular cluster; wherein the operation includes updating a target resource based on the representative node.

3. The method of claim 1, wherein the operation includes reconciling target resources associated with a particular cluster of the plurality of clusters such that parameter sets of the target resources match.

4. The method of claim 1, wherein the operation includes installing a software package on at least one target resource.

5. The method of claim 1, wherein generating the plurality of clusters comprises generating a first set of clusters of signature vectors; and generating a second set of clusters of distinct parameter sets by mapping one or more parameter sets of the plurality of parameter sets to each signature in the first set of clusters.

6. The method of claim 1, wherein generating the plurality of clusters comprises generating a similarity matrix that includes similarity indices for different pairs of signature vectors of the plurality of signature vectors; wherein the plurality of clusters are generated based on at least one eigenvector or eigenvalue of the similarity matrix.

7. The method of claim 1, further comprising generating a representative node for a cluster based on frequently installed software packages among target resources associated with the cluster.

8. The method of claim 1, wherein the operation is performed responsive to a selection; wherein the operation is performed based at least in part on one or more parameters of a parameter set represented by the at least one node.

9. The method of claim 1, further comprising displaying an intersection complement for at least one cluster of the plurality of clusters, wherein the intersection complement identifies parameters that are common to target resources in one cluster but that are not common to target resources in other clusters.

10. One or more non-transitory computer-readable media storing instructions which, when executed by one or more hardware processors, cause operations comprising:
receiving a plurality of parameter sets of varying lengths, wherein a parameter set in the plurality of parameter sets identifies attributes of a target resource;
generating a plurality of signature vectors based on the plurality of parameter sets, wherein the plurality of signature vectors have equal lengths, wherein at least one signature vector of the plurality of signature vectors maps to two or more parameter sets of the plurality of parameter sets;
generating a plurality of clusters that group distinct parameter sets of the plurality of parameter sets based on similarity between the signature vectors;
performing an operation on a target resource based on at least one node in the plurality of clusters.

11. The one or more non-transitory media of claim 10, wherein the at least one node in the plurality of clusters is a representative node for a particular cluster; wherein the operation includes updating a target resource based on the representative node.

12. The one or more non-transitory media of claim 10, wherein the operation includes reconciling target resources associated with a particular cluster of the plurality of clusters such that parameter sets of the target resources match.

13. The one or more non-transitory media of claim 10, wherein the operation includes installing a software package on at least one target resource.

14. The one or more non-transitory media of claim 10, wherein instructions for generating the plurality of clusters comprise instructions for generating a first set of clusters of signature vectors; and generating a second set of clusters of distinct parameter sets by mapping one or more parameter sets of the plurality of parameter sets to each signature in the first set of clusters.

15. The one or more non-transitory media of claim 10, wherein instructions for generating the plurality of clusters comprise instructions for generating a similarity matrix that includes similarity indices for different pairs of signature vectors of the plurality of signature vectors; wherein the plurality of clusters are generated based on at least one eigenvector or eigenvalue of the similarity matrix.

16. The one or more non-transitory media of claim 10, wherein the instructions further cause operations comprising generating a representative node for a cluster based on frequently installed software packages among target resources associated with the cluster.

17. The one or more non-transitory media of claim 10, wherein the operation is performed responsive to a selection; wherein the operation is performed based at least in part on one or more parameters of a parameter set represented by the at least one node.

18. The one or more non-transitory media of claim 10, wherein the instructions further cause operations comprising displaying an intersection complement for at least one cluster of the plurality of clusters, wherein the intersection complement identifies parameters that are common to target resources in one cluster but that are not common to target resources in other clusters.

19. A system comprising:
one or more hardware processors;
one or more non-transitory computer-readable media storing instructions which, when executed by the one or more hardware processors, cause operations comprising:
receiving a plurality of parameter sets of varying lengths, wherein a parameter set in the plurality of parameter sets identifies attributes of a target resource;
generating a plurality of signature vectors based on the plurality of parameter sets, wherein the plurality of signature vectors have equal lengths, wherein at least one signature vector of the plurality of signature vectors maps to two or more parameter sets of the plurality of parameter sets;

generating a plurality of clusters that group distinct parameter sets of the plurality of parameter sets based on similarity between the signature vectors;

performing an operation on a target resource based on at least one node in the plurality of clusters.

20. The system of claim 19, wherein the at least one node in the plurality of clusters is a representative node for a particular cluster; wherein the operation includes updating a target resource based on the representative node.

\* \* \* \* \*